United States Patent
Oohinata et al.

(10) Patent No.: US 12,135,086 B2
(45) Date of Patent: Nov. 5, 2024

(54) MATERIAL FOR GASKET

(71) Applicant: NICHIAS CORPORATION, Tokyo (JP)

(72) Inventors: Tetsuo Oohinata, Tokyo (JP); Nahoko Kitajima, Tokyo (JP)

(73) Assignee: NICHIAS CORPORATION, Tokyo (JP)

( * ) Notice: Subject to any disclaimer, the term of this patent is extended or adjusted under 35 U.S.C. 154(b) by 428 days.

(21) Appl. No.: 17/434,169

(22) PCT Filed: Feb. 20, 2020

(86) PCT No.: PCT/JP2020/006764
§ 371 (c)(1),
(2) Date: Aug. 26, 2021

(87) PCT Pub. No.: WO2020/175311
PCT Pub. Date: Sep. 3, 2020

(65) Prior Publication Data
US 2022/0170549 A1    Jun. 2, 2022

(30) Foreign Application Priority Data
Feb. 27, 2019 (JP) ................. 2019-033793

(51) Int. Cl.
*F16J 15/12* (2006.01)
*C09K 3/10* (2006.01)

(52) U.S. Cl.
CPC ............. *F16J 15/12* (2013.01); *C09K 3/1009* (2013.01); *C09K 2003/1084* (2013.01); *C09K 2200/0213* (2013.01); *C09K 2200/0612* (2013.01); *C09K 2200/0637* (2013.01); *C09K 2200/0647* (2013.01); *C09K 2200/0672* (2013.01)

(58) Field of Classification Search
CPC ............. F16J 15/12; C09K 3/1009; C09K 2003/1084; C09K 2200/0213; C09K 2200/0612; C09K 2200/0637; C09K 2200/0647; C09K 2200/0672
See application file for complete search history.

(56) References Cited

U.S. PATENT DOCUMENTS

| | | | |
|---|---|---|---|
| 10,001,240 B1 * | 6/2018 | Dray | F16L 55/46 |
| 2003/0022005 A1 | 1/2003 | Miyashita et al. | |
| 2007/0087157 A1 | 4/2007 | Saito et al. | |
| 2008/0124561 A1 | 5/2008 | Saito et al. | |
| 2014/0004363 A1 * | 1/2014 | Yokota | C08K 5/40 524/566 |
| 2014/0363679 A1 | 12/2014 | Arisawa et al. | |
| 2016/0369742 A1 | 12/2016 | Tanaka et al. | |

FOREIGN PATENT DOCUMENTS

| | | | | |
|---|---|---|---|---|
| CN | 1397751 A | 2/2003 | | |
| CN | 1951686 A | 4/2007 | | |
| CN | 104053933 A | 9/2014 | | |
| CN | 105308368 A | 2/2016 | | |
| DE | 102006049386 A1 | 4/2007 | | |
| JP | 3-227622 A | 10/1991 | | |
| JP | 2002-264253 A | 9/2002 | | |
| JP | 2006-218629 A | 8/2006 | | |
| JP | 2007-196690 A | 8/2007 | | |
| JP | 2015003982 A * | 1/2015 | | |
| JP | 6059664 B2 | 1/2017 | | |
| JP | 2018115668 A * | 7/2018 | ............... | C09D 1/00 |
| JP | 2018-176435 A | 11/2018 | | |
| KR | 10-2007-0042880 A | 4/2007 | | |
| WO | 2015/045513 A1 | 4/2015 | | |

OTHER PUBLICATIONS

Machine Translation of Tachiki (JP 2018115668 A) (Year: 2018).*
Machine Translation of Takahashi et al. (JP 2015003982 A) (Year: 2015).*
Extended European Search Report dated Oct. 20, 2022, issued in counterpart EP Application No. 20763764.6. (7 pages).
Office Action dated Sep. 30, 2022, issued in counterpart CN Application No. 202080016537.0, with English Translation. (19 pages).
International Search Report dated Apr. 21, 2020, issued in counterpart International Application No. PCT/JP2020/006764 (2 pages).
Office Action dated Dec. 21, 2022, issued in counterpart KR application No. 10-2021-7030411, with English translation. (8 pages).

* cited by examiner

*Primary Examiner* — Callie E Shosho
*Assistant Examiner* — Bethany M Miller
(74) *Attorney, Agent, or Firm* — WHDA, LLP

(57) ABSTRACT

A material for gaskets is disclosed, wherein a metal surface coating layer, a primer layer and a rubber layer are formed, or a metal surface coating layer and a rubber layer are formed on at least a part of one side or both sides of a substrate formed of a metal plate sequentially from the metal plate side, and the metal surface coating layer comprises (A) one or more carbonates selected from the group consisting of Mg carbonate, Co carbonate, Zr carbonate, Mn carbonate, Ni carbonate, and Cu carbonate and (B) one or more selected from the group consisting of silica, alumina, zirconia, and titania.

6 Claims, No Drawings

MATERIAL FOR GASKET

TECHNICAL FIELD

The present invention relates to a material for gaskets.

BACKGROUND ART

As gaskets used for engines for cars or the like, especially as head gaskets, gasket materials in which a chromate coating layer comprising a chromium compound, phosphoric acid, and silica is formed on one side or both sides of a steel plate, and a rubber layer is layered on the chromate coating layer have been widely used until now (Patent Literature 1).

However, gasket materials provided with non-chromate coating layers instead of chromate coating layers have also been used due to environmental problems in recent years (Patent Literature 2).

Even though gasket materials provided with non-chromate coating layers are compared with gasket materials provided with chromate coating layers, the gasket materials provided with non-chromate coating layers need to have liquid resistance adhesion to water or antifreeze which is almost equal to that of the gasket materials provided with chromate coating layers. Rubber layers in a portion in contact with water or antifreeze used as liquid coolant for engines need to be prevented from exfoliating for a long period of time in use environments of engines for cars or the like.

As a gasket material provided with a non-chromate coating layer having high liquid resistance adhesion, for example, Patent Literature 3 then discloses a material for gaskets wherein a non-chromate coating, a phenolic resin primer layer, and a polyol-crosslinked Fluorocarbon Rubber layer are formed on one side or both sides of a steel plate sequentially from the steel plate side, the polyol-crosslinked Fluorocarbon Rubber layer is a rubber layer obtained by applying a Fluorocarbon Rubber composition containing Fluorocarbon Rubber, a polyol-based crosslinking agent, an amine-based crosslinking promoter, and silica to the phenolic resin primer layer and then heating the composition, and the amine-based crosslinking promoter is a tertiary amine or a salt of the tertiary amine obtained by the reaction of the tertiary amine and an acid.

CITATION LIST

Patent Literature

[Patent Literature 1] Japanese Patent Application Publication No. 3-227622
[Patent Literature 2] Japanese Patent Application Publication No. 2002-264253
[Patent Literature 3] Japanese Patent No. 6059664

SUMMARY OF INVENTION

Technical Problem

In Patent Literature 3, the liquid resistance adhesion to antifreeze is dramatically improved by incorporating silica into a rubber layer of a material for gaskets as compared with a material for gaskets in which a rubber layer does not contain silica.

However, use environments required for gaskets have been severer in recent years due to change or increase in additives such as an antirust agent, a pH adjuster, and a stabilizer due to an increase in temperature for the extension of travel distance or improvement in fuel consumption, or the life prolongation of antifreeze. Especially, with an increase in temperature, components in antifreeze permeate a rubber layer easily and reach the adhesive interface earlier, resulting in rapid decrease in the adhesive strength. Thus, further improvement is required for materials for gaskets.

Accordingly, an object of the present invention is to provide a material for gaskets wherein a rubber layer is formed via a non-chromate metal surface coating layer on one side or both sides of a substrate formed of a metal plate, the liquid resistance adhesion to water and antifreeze is high, and rubber in a portion in contact with water or antifreeze hardly exfoliates in actual use environments of engines for cars or the like.

Solution to Problem

The above-mentioned problem is solved by the present inventions shown below.

That is, the present invention (1) provides a material for gaskets, comprising at least a substrate formed of a metal plate, a metal surface coating layer formed on one side surface or both side surfaces of the substrate, and a rubber layer formed via the metal surface coating layer, wherein the metal surface coating layer comprises (A) one or more carbonates selected from the group consisting of Mg carbonate, Co carbonate, Zr carbonate, Mn carbonate, Ni carbonate, and Cu carbonate and (B) one or more selected from the group consisting of silica, alumina, zirconia, and titania.

The present invention (2) provides the material for gaskets of (1), comprising: a primer layer formed between the metal surface coating layer and the rubber layer, wherein the primer layer comprises a cured product of a phenolic resin or a cured product of an epoxy resin.

The present, invention (3) provides the material for gaskets of any one of (1) and (2), wherein rubber forming the rubber layer is nitrile rubber.

The present invention (4) provides the material for gaskets of any one of (1) and (2), wherein robber forming the rubber layer is Fluorocarbon Rubber.

The present invention (5) provides the material for gaskets of any one of (1) to (4), wherein the metal surface coating layer is a surface coating layer formed by applying a treatment liquid for forming a metal surface coating layer comprising (A) one or more carbonates selected from the group consisting of Mg carbonate, Co carbonate, Zr carbonate, Mn carbonate, Ni carbonate, and Cu carbonate and (B) one or more selected from the group consisting of silica, alumina, zirconia, and titania to a surface of the substrate and then drying the liquid.

Advantageous Effects of Invention

According to the present invention, a material for gaskets wherein a rubber layer is formed via a non-chromate metal surface coating layer on one side or both sides of a substrate formed of a metal plate, the liquid resistance adhesion to water and antifreeze is high, and rubber in a portion in contact with water or antifreeze hardly exfoliates in actual use environments of engines for cars or the like can be provided.

DESCRIPTION OF EMBODIMENTS

A material for gaskets of the present invention is a material for gaskets, comprising at least a substrate formed of a metal plate, a metal surface coating layer formed on one side surface or both side surfaces of the substrate, and a rubber layer formed via the metal surface coating agent, wherein the metal surface coating layer comprises (A) one or more carbonates selected from the group consisting of Mg carbonate, Co carbonate, Zr carbonate, Mn carbonate, Ni carbonate, and Cu carbonate and (B) one or more selected from the group consisting of silica, alumina, zirconia, and titania.

The material for gaskets of the present invention has at least the substrate formed of the metal plate; the metal surface coating layer formed on the one side surface or both side surfaces of the substrate; and the rubber layer formed via the metal surface coating agent. In the material for gaskets of the present invention, a portion in which the metal surface coating layer and the rubber layer are formed on the substrate formed of the metal plate is at least a part of the one side or at least a part of both sides of the substrate. In the present invention, "The rubber layer is formed via the metal surface coating agent on the substrate." means that the metal surface coating layer exists between the substrate and the rubber layer, and include both of the case where the rubber layer is formed in direct contact with the surface of the metal surface coating agent and the case where other layers are formed between the metal surface coating agent and the rubber layer, and the rubber layer is formed out of direct contact with the surface of the metal surface coating agent.

In the material for gaskets of the present invention, examples of the layering form of the layers formed on the surface of the substrate include a two-layer structure in which the metal surface coating layer and the rubber layer are formed sequentially from the metal plate side and a three-layer structure in which the metal surface coating layer, a primer layer and the rubber layer are formed sequentially from the metal plate side. In the material for gaskets of the present invention, the layering form on one surface side of the substrate and the layering form on the other surface side may be the same or different.

Among materials for gaskets of the present invention, (1) a material for gaskets having a substrate, a metal surface coating layer formed on the surface of the substrate, a primer layer formed on the surface of the metal surface coating layer opposite to the substrate side, and a rubber layer formed on the surface of the primer layer opposite to the metal surface coating layer side is also described as a material for gaskets of a first form of the present invention, and (2) a material for gaskets having a substrate, a metal surface coating layer formed on the surface of the substrate, and a rubber layer formed on the surface of the metal surface coating layer opposite to the substrate side is also described as a material for gaskets of a second form of the present invention. In both the material for gaskets of the first form of the present invention and the material for gaskets of the second form of the present invention, the rubber layer is formed via the metal surface coating layer on the surface of the substrate.

Although the material for gaskets of the first form of the present invention and the material for gaskets of the second form of the present invention are different in whether the material has the primer layer between the metal surface coating layer and the rubber layer or not, the material for gaskets of the first form of the present invention and the material for gaskets of the second form of the present invention also have many common points. As to the common points to the material for gaskets of the first form of the present invention and the material for gaskets of the second form of the present invention, a general term for the material for gaskets of the first form of the present invention and the material for gaskets of the second form of the present invention will be then described as a material for gaskets of the present invention and explained.

The substrate related to the material for gaskets of the present invention is formed of a metal plate. Although the metal constituting the substrate is not particularly limited, examples thereof include stainless steel such as ferritic stainless steel, martensitic stainless steel, and austenitic stainless steel; iron; and aluminum, and stainless steel is preferable among these.

The metal plate constituting the substrate related to the material for gaskets of the present invention may be a metal plate obtained by pasting and joining a plurality of metal plates together. As the metal plate obtained by pasting and joining the plurality of metal plates together, a joined object of a stainless steel plate and an iron plate is preferable.

Although, in the material for gaskets of the present invention, the thickness of the metal plate which is the substrate is not particularly limited, the thickness is usually 0.15 to 0.50 mm and preferably 0.20 to 0.30 mm.

The metal surface coating layer related to the material for gaskets of the present invention contains (A) one or more carbonates selected from the group consisting of Mg carbonate, Co carbonate, Zr carbonate, Mn carbonate, Ni carbonate, and Cu carbonate and (B) one or more selected from the group consisting of silica, alumina, zirconia, and titania.

The one or more carbonates selected from the group consisting of Mg carbonate, Co carbonate, Zr carbonate, Mn carbonate, Ni carbonate, and Cu carbonate of the component (A) may be normal salts or basic salts. The carbonate of the component (A) may be one or a combination of two or more.

When the carbonate of the component (A) is a normal salt, examples of the normal salt include magnesium carbonate, cobalt carbonate, manganese carbonate, nickel carbonate, and copper carbonate.

When the carbonate of a component (A) is a basic salt, examples of the basic salt include basic magnesium carbonate, basic cobalt carbonate, basic zirconium carbonate, ammonium zirconium carbonate, basic manganese carbonate, basic nickel carbonate, and basic copper carbonate.

If the carbonate of the component (A) is any one or more of Mg carbonate, Co carbonate, Zr carbonate, Mn carbonate, Ni carbonate, and Cu carbonate, the carbonate may be any carbonate, and especially Zr carbonate is preferable from the viewpoint that the liquid resistance adhesion to water and antifreeze used as engine cooling water is high.

The silica of the component (B) may be any of wet silica synthesized by a wet process and dry silica synthesized by a dry process. The silica of the component (B) derived from a silica-containing material which is excellent in dispersibility in treatment liquid for forming a metal surface coating layer, for example, the silica of the component (B) derived from water-dispersible silica such as colloidal silica and the silica of the component (B) derived from water-dispersible silica of gas phase silica, is preferable. The silica of the component (B) may be one or a combination of two or more.

Although wet silica related to the component (B) is not particularly limited, examples thereof include Nipsil AQ, Nipsil VN3, Nipsil LP, Nipsil ER, Nipsil NA, Nipsil K-500, Nipsil E-200, Nipsil E-743, Nipsil E-74P, Nipsil SS-10, Nipsil SS-30P, and Nipsil SS-100 (all are produced by TOSOH SILICA CORPORATION).

Although the colloidal silica related to the component (B) is not particularly limited, the colloidal silica may be a commercial item. Examples thereof include SNOWTEX C, SNOWTEX N, SNOWTEX S, SNOWTEX UP, SNOWTEX PS-M, SNOWTEX PS-L, SNOWTEX 20, SNOWTEX 30, and SNOWTEX 40 (all are produced by Nissan Chemical Corporation).

Although the dry silica related to the component (B) is not particularly limited, examples thereof include AEROSIL 50, AEROSIL 130, AEROSIL 200, AEROSIL 300, AEROSIL 380, AEROSIL R972, AEROSIL TT600, AEROSIL MOX80, and AEROSIL MOX170 (all are produced by NIPPON AEROSIL CO., LTD.).

Examples of the alumina of the component (B) include powdery alumina and water-dispersible alumina. Examples of the alumina of the component (B) include alumina obtained by gas phase reaction and alumina obtained by liquid phase reaction.

Examples of the zirconia of the component (B) include powdery zirconia and water-dispersible zirconia. Examples of the zirconia of the component (B) include zirconia obtained by gas phase reaction and zirconia obtained by liquid phase reaction.

Examples of the titania of the component (B) include powdery titania and water-dispersible titania. Examples of the titania of the component (B) include titania obtained by gas phase reaction and titania obtained by liquid phase reaction.

The component (B) is any one of silica, alumina, zirconia, and titania or a combination of two or more thereof.

In the material for gaskets according to the present invention, the coating mass of the metal surface coating layer is a coating mass such that the coating mass of the component (B) is preferably 5G to 1000 mg/m$^2$, particularly preferably 50 to 800 mg/m$^2$, and more preferably 50 to 500 mg/m$^2$, in terms of the coating mass of the component (B). The coating mass of the metal surface coating layer is calculated from the coating area of a measured sample and the mass of the component (B). When the coating mass of the metal surface coating layer is in the above-mentioned range, the liquid resistance adhesion to water and antifreeze used as engine cooling water is high, and the adhesion is high.

As to the contents of the component (A) and the component (B) in the metal surface coating layer, the content of the component (B) is preferably 30 to 400 parts by mass, and the content of the component (B) is more preferably 50 to 300 parts by mass based on 100 parts by mass of the component (A). When the contents of the component (A) and a component (B) in the metal surface coating layer are in the above-mentioned ranges, the liquid resistance adhesion to water and the antifreeze used as engine cooling water is high.

When the metal surface coating layer contains the component (A) and the component (B), the liquid resistance adhesion to water and antifreeze used as engine cooling water is high, and the adhesion of the metal surface coating layer to the substrate is high without performing chromate treatment.

The method for forming a metal surface coating layer is not particularly limited. Examples of the metal surface coating layer include a metal surface coating layer formed by applying a treatment liquid for forming a metal surface coating layer comprising (A) one or more carbonates selected from the group consisting of Mg carbonate, Co carbonate, Zr carbonate, Mn carbonate, Ni carbonate, and Cu carbonate and (B) one or more selected from the group consisting of silica, alumina, zirconia, and titania to a surface of the substrate and then drying the liquid.

The treatment liquid for forming a metal surface coating layer is a dispersion in which the component (A) and the component (B) are dispersed in a dispersion medium such as water, ethanol, isopropyl alcohol, or methanol. The dispersion medium related to the treatment liquid for forming a metal surface coating layer is preferably water. The solid concentration of the treatment liquid for forming a metal surface coating layer is suitably selected depending on workability, available time, uniformity at the time of application, and is preferably 1 to 50% by mass and particularly preferably 5 to 20% by mass. The treatment liquid for forming a metal surface coating layer can contain ammonia, a dispersant, and the like.

Examples of a method of forming a metal surface coating layer on the surface of a substrate include a method in which treatment liquid for forming a metal surface coating layer is applied using application means such as a roll coater, dipping, and spraying, and volatile matter such as a dispersion medium is subsequently dried by heating the treatment liquid at 100 to 250° C., air-drying the treatment liquid at normal temperature, and the like to form a metal surface coating layer on the surface of a substrate.

In the material for gaskets of the first form of the present invention, the primer layer is formed on the surface of the metal surface coating layer opposite to the substrate side.

If the primer layer is used as a primer layer of the material for gaskets, the primer layer is not particularly limited. Examples thereof include primer layers comprising cured products of thermosetting resins such as cured products of phenolic resins such as novolac type phenolic resins and resol type phenolic resins, cured products of epoxy resins, and cured products of mixtures of phenolic resins and epoxy resins; primer layers comprising cured products of mixtures of thermosetting resins and rubber compositions; primer layers comprising cured products of thermosetting resins containing a coupling agent, a filler such as a metal oxide, and the like; primer layers comprising cured products of mixtures of thermosetting resins containing a coupling agent, a filler such as a metal oxide, and the like and rubber compositions. When the rubber layer is Fluorocarbon Rubber, examples of the rubber composition contained in the primer layer include a rubber composition containing Fluorocarbon Rubber. When the rubber layer is NBR, examples of the rubber composition contained in the primer layer include a rubber composition containing NBR. Among these, the primer layer is preferably a primer layer comprising a cured product of a novolac type phenolic resin or a cured product of an epoxy resin.

The primer layer has the function of increasing the adhesiveness between the metal surface coating layer and the rubber layer and the liquid resistance adhesion to water and antifreeze used as engine cooling water.

The primer layer can contain a filler, a coupling agent, and the like.

The method for forming a primer layer is not particularly limited. Examples of the primer layer include a primer layer formed by applying a resin composition for forming a primer layer to the surface of a metal surface coating layer opposite to the substrate side and then heating the resin composition.

The resin composition for forming a primer layer contains a thermosetting resin such as an epoxy resin or a phenolic resin such as a novolac type phenolic resin or a resol type phenolic resin. The resin composition for forming a primer layer can contain a coupling agent, a filler such as a metal oxide, and the like besides a thermosetting resin. When the rubber layer is Fluorocarbon Rubber, the resin composition can further contain a rubber composition containing Fluorocarbon Rubber. When the rubber layer is NBR, the resin composition can further contain a rubber composition containing NBR. The thermosetting resin may be one or a combination of two or more.

Examples of the method of forming a primer layer on the surface of a metal surface coating layer include a method in which a resin composition for forming a primer layer is applied using application means such as a roll coater, dipping, and spraying, subsequently heated at 100 to 250° C., and cured to form a primer layer on the surface of a metal surface coating layer.

In the material for gaskets of the first form of the present invention, the rubber layer is formed on the surface of the primer layer opposite to the metal surface coating layer side. In the material for gaskets of the second form of the present invention, the rubber layer is formed on the surface of the metal surface coating layer opposite to the substrate side.

Examples of the rubber material constituting the rubber layer include nitrile rubber (NBR), Fluorocarbon Rubber, silicon rubber, acrylobutadiene rubber, hydrogenated nitrile rubber (HNBR), and ethylene-propylene-diene rubber (EPDM). When the material for gaskets of the present invention is for gaskets used for the peripheries of engines for cars, oil resistance and heat resistance is required. Therefore, NBR or Fluorocarbon Rubber is preferable as the rubber material.

Nitrile rubber (NBR) is a general term for copolymers obtained using at least acrylonitrile and 1,3-butadiene as monomers. Nitrile rubber (NBR) also include a copolymer obtained by copolymerizing various comonomers in addition to acrylonitrile and 1,3-butadiene besides a copolymer of acrylonitrile and 1,3-butadiene.

Examples of the crosslinking agent of nitrile rubber (NBR) include sulfur. Although the content of the crosslinking agent of nitrile rubber (NBR) is suitably selected depending on the type of nitrile rubber (NBR) or the like, the content is usually 0.5 to 10 parts by mass and preferably 2 to 3 parts by mass based on 100 parts by mass of nitrile rubber (NBR).

The Fluorocarbon Rubber is Fluorocarbon Rubber which can be polyol-crosslinked by a polyol crosslinking agent. Examples of such Fluorocarbon Rubber include vinylidene fluoride/hexafluoropropylene-based copolymers, vinylidene fluoride/hexafluoropropylene/tetrafluoroethylene-based copolymers, and tetrafluoroethylene/propylene/vinylidene fluoride-based copolymers.

As long as the polyol crosslinking agent of Fluorocarbon Rubber reacts with Fluorocarbon Rubber and crosslink the Fluorocarbon Rubber, the polyol crosslinking agent is not particularly limited. Examples of the polyol crosslinking agent of Fluorocarbon Rubber include polyhydroxy aromatic compounds such as 2,2-bis(4-hydroxyphenyl)propane [bisphenol A], 2,2-bis(4-hydroxyphenyl)perfluoropropane [bisphenol AF], 1,3-dihydroxybenzene, 4,4'-dihydroxydiphenyl, 4,4'-dihydroxydiphenylmethane, and 2,2-bis(4-hydroxyphenyl)butane; and alkali metal salts thereof or alkaline-earth metal salts thereof. Bisphenols such as bisphenol A and bisphenol AF; and alkali metal salts thereof or alkaline-earth metal salts thereof are preferable.

Although the content of the polyol crosslinking agent of Fluorocarbon Rubber is suitably selected depending on the type of Fluorocarbon Rubber or the like, the content is usually 0.5 to 10 parts by mass and preferably 2 to 8 parts by mass based on 100 parts by mass of Fluorocarbon Rubber.

It is preferable that the rubber layer contain silica from the viewpoint that the liquid resistance adhesion to water and antifreeze used as engine cooling water is high. Silica contained in the rubber layer may be any of wet silica synthesized by the wet process and dry silica synthesized by the dry process. Silica contained in the rubber layer may be one or a combination of two or more.

Although the wet silica related to the rubber layer is not particularly limited, examples thereof include Nipsil AQ, Nipsil VN3, Nipsil LP, Nipsil ER, Nipsil NA, Nipsil K-500, Nipsil E-200, Nipsil E-743, Nipsil E-74P, Nipsil SS-10, Nipsil SS-30P, Nipsil SS-30V, and Nipsil SS-100 (all are produced by TOSOH SILICA CORPORATION).

Although the dry silica related to the rubber layer is not particularly limited, examples thereof include AEROSIL 50, AEROSIL 130, AEROSIL 200, AEROSIL 300, AEROSIL 380, AEROSIL R972, AEROSIL TT600, AEROSIL MCX80, and AEROSIL MOX170 (all are produced by NIPPON AEROSIL CO., LTD.).

When the rubber composition contains silica, the content of silica in the rubber layer is preferably 1 to 200 parts by mass, particularly preferably 10 to 100 parts by mass, and more preferably 3 to 100 parts by mass based on 100 parts by mass of the rubber material. When the content of silica in the rubber layer is in the above-mentioned range, the liquid resistance adhesion to water and antifreeze used as engine cooling water is high.

The method for forming a rubber layer is not particularly limited. Examples of the rubber layer related to the material for gaskets of the first form of the present invention include a rubber layer formed by applying the rubber composition to the surface of the primer layer opposite to the metal surface coating layer side, and then heating and crosslinking the rubber composition. Examples of the rubber layer related to the material for gaskets of the second form of the present invention include a rubber layer formed by applying the rubber composition to the surface of the metal surface coating layer opposite to the substrate side, and then heating and crosslinking the rubber composition.

The rubber composition contains a rubber material and a crosslinking agent. The rubber composition can contain one or more of a crosslinking promoter, a crosslinking promoting aid, silica, a filler, a coupling agent, and the like if needed. The components of the rubber composition are dispersed or dissolved in an organic solvent to prepare rubber composition liquid, the rubber composition is applied to the surface of the primer layer or the metal surface coating layer by applying the obtained rubber composition liquid to the primer layer or the metal surface coating layer. The rubber composition liquid is obtained by kneading the components of the rubber composition with the organic solvent.

If the crosslinking promoter of the polyol crosslinking for Fluorocarbon Rubber is marketed, the crosslinking promoter is not particularly limited. Examples thereof include tertiary ammonium salts, quaternary ammonium salts, and quaternary phosphonium salts, and tertiary ammonium salts are preferable. Examples of the type for vulcanization for NBR include guanidinium-based type, thiazole-based type, sulfenamide-based type, thiourea-based type, thiuram-based type, and dithiocarbamate-based type.

Examples of the crosslinking promoting aid contained in the rubber composition if needed include magnesium oxide and calcium hydroxide. Examples of the filler contained in the rubber composition if needed include carbon black, calcium carbonate, clay, wollastonite, mica, talc, and barium sulfate.

The coupling agent contained in the rubber composition if needed is used to improve the adhesion between the primer layer and the rubber layer. Although the coupling agent contained in the rubber composition is not limited, an amine-based silane coupling agent is preferable. Examples of the amine-based silane coupling agent include 3-triethoxysilyl-N-(1,3-dimethyl-dibutylidene) propylamine, N-(β-aminoethyl)-γ-aminopropylmethyldimethoxysilane, N-(β-aminoethyl)-γ-amincpropyltrimethoxysilane, N-(β-aminoethyl)-γ-aminopropyltriethoxysilane, γ-aminopropyltrimethoxysilane, γ-aminopropyltriethozysilane, and N-phenyl-γ-aminopropyltrimethoxysilane. The content of the silane coupling agent in the rubber composition is preferably 0.5 to 5 parts by mass based on 100 parts by mass of the rubber material.

Examples of the organic solvent used as the dispersion medium or the solvent of the rubber composition include ketone-based organic solvents such as methyl ethyl ketone, methyl propyl ketone, methyl butyl ketone, methyl isobutyl ketone, and diisobutyl ketone; toluene; butyl acetate; and ethyl acetate. Among these, ketone-based organic solvents are preferable. The solid content in the rubber composition liquid, namely the content of the rubber composition in the rubber composition liquid, is preferably 10 to 50% by mass based on the total amount of the rubber composition liquid from the viewpoint that the handling of coating liquid is good.

Examples of the method for forming a rubber layer on the surface of a primer layer in a material for gaskets of the first form of the present invention include a method in which rubber composition liquid is applied using application means such as a roll coater, dipping, and spraying, subsequently heated and crosslinked in the range of 150 to 230° C. for around 1 to 10 minutes so that the degree of crosslinking is adapted to the degree of crosslinking of rubber of interest to form a rubber layer on the surface of a primer layer. Examples of the method for forming a rubber layer on the surface of a metal surface coating layer in a material for gaskets of the second form of the present invention include a method in which rubber composition liquid is applied using application means such as a roll coater, dipping, and spraying, subsequently heated and crosslinked in the range of 150 to 230° C. for around 1 to 10 minutes so that the degree of crosslinking is adapted to the degree of crosslinking of rubber of interest to form a rubber layer on the surface of a metal surface coating layer.

Although the coating thickness of the rubber composition liquid is not particularly limited, rubber composition liquid is applied so that the thickness of the rubber layer after heating and crosslinking is 5 to 100 μm and preferably 10 to 50 μm. It is preferable that the heating temperature is 150 to 200° C., and the heating time is 5 to 30 minutes under heating conditions when the rubber composition is heated to perform crosslinking reaction.

The gasket material of the present invention is suitably subjected to severance, cutting, processing, and the like if needed and processed into the shape of a gasket of interest.

According to the gasket material of the present invention, a material for gaskets with high liquid resistance adhesion to water and antifreeze used as engine cooling water can be provided without performing chromate treatment.

Although the present invention will next be described further specifically by giving Examples, these are illustration and do not limit the present invention.

EXAMPLES AND COMPARATIVE EXAMPLES (1) Each of treatment liquids for forming metal surface coating layers shown in Table 1 was applied using a roll coater so that a B component was 300 mg/m² per one side in terms of the solid contents and then heat-treated to form a metal surface coating layer on the surface of a substrate.

(2) Subsequently, a resin liquid for forming a primer layer in which a phenolic resin was dissolved in an organic solvent (methyl ethyl ketone MEK) so that the solid concentration was 10% was applied to the whole surface of the metal surface coating layer formed above at 150 mg/m² per one side using a roll coater, then heated and cured to form a printer layer on the surface of the metal surface coating layer.

(3) Then, each of rubber compositions shown in Table 1 and an organic solvent (methyl ethyl ketone MEK) were mixed so that the solid concentration was 40% by mass to obtain rubber composition liquid. Next, the obtained rubber composition liquid was applied to the whole surface of the primer layer formed above using a roll coater so that the thickness of a rubber layer was 25 μm, then heated and crosslinked to form the rubber layer having a thickness of 25 μm, and a material for gaskets was obtained.

When the obtained material for gaskets was partially severed, cut and processed, the material for gaskets could be easily processed precisely and was excellent in the processability.

The liquid resistance adhesion was evaluated by the following method as to the obtained material for gaskets. Table 1 shows the results.

Liquid Resistance Adhesion Test

A sample for a liquid resistance adhesion test in a size of 25 mm×100 mm was provided, and the sample was maintained at 95° C. for 500 hours with the sample half-immersed in an aqueous 1.5% by mass dipotassium hydrogen phosphate solution. Then, the surface of the sample was exfoliated with cellophane tape several times and then further subjected to a scratch drawing test based on JIS K6894 with a scratch drawing tester, and residual rubber is confirmed.

Dipotassium hydrogen phosphate is one of the components contained in antifreeze, and is a component added to mainly play the roles of a pH adjuster, an antiseptic, a stabilizer, and the like. Since exfoliation was further promoted by adding this chemical, the aqueous dipotassium hydrogen phosphate solution was used as liquid for an exfoliation promotion test.

Evaluation Standard

Five points: The rubber layer is not exfoliated.

Four points: 90% or more of the rubber layer remains.

Three points: 50% or more and less than 90% of the rubber layer remains.

Two points: Less than 50% of the rubber layer remains.

One point: The rubber layer does not remain, or the rubber layer has blisters after the sample is taken out.

TABLE 1

| | Composition of treatment liquid for metal surface coating layer | | | | | Liquid resistance adhesion | |
|---|---|---|---|---|---|---|---|
| | A component (parts by mass) | B component (parts by mass) | | Acid component | Rubber layer[1] | Blister | Point |
| Example 1 | Mg carbonate 100 | Silica | 50 | — | FKM | Not exist | 3 |
| Example 2 | Mg carbonate 100 | Silica | 300 | — | NBR | Not exist | 4 |
| Example 3 | Mg carbonate 100 | Titania | 100 | — | NBR | Not exist | 4 |
| Example 4 | Zr carbonate 100 | Silica | 50 | — | FKM | Not exist | 4 |
| Example 5 | Zr carbonate 100 | Silica | 300 | — | NBR | Not exist | 5 |
| Example 6 | Zr carbonate 100 | Alumina | 100 | — | NBR | Not exist | 5 |
| Example 7 | Zr carbonate 100 | Silica + Alumina | 200 | — | FKM | Not exist | 4 |
| Example 8 | Zr carbonate 100 | Silica + Titania | 200 | — | FKM | Not exist | 4 |
| Example 9 | Zr carbonate 100 | Titania | 100 | — | FKM | Not exist | 3 |
| Example 10 | Co carbonate 100 | Alumina | 50 | — | FKM | Not exist | 2 |
| Example 11 | Co carbonate 100 | Titania | 50 | — | FKM | Not exist | 2 |
| Example 12 | Co carbonate 100 | Zirconia | 50 | — | FKM | Not exist | 2 |
| Example 13 | Co carbonate 100 | Zirconia | 300 | — | FKM | Not exist | 4 |
| Comparative Example 1 | — | — | Silica | 100 | Phosphoric acid | FKM | Exist | 1 |
| Comparative Example 2 | — | — | Alumina | 100 | Phosphoric acid | FKM | Exist | 1 |
| Comparative Example 3 | — | — | Titania | 100 | Phosphoric acid | FKM | Exist | 1 |
| Comparative Example 4 | — | — | Silica + Zirconia | 100 | Phosphoric acid | FKM | Exist | 1 |
| Comparative Example 5 | — | — | Silica + Zirconia | 100 | Phosphoric acid | NBR | Exist | 1 |
| Comparative Example 6 | — | — | Silica | 100 | Nitric acid | NBR | Exist | 1 |
| Comparative Example 7 | — | — | Alumina | 100 | Nitric acid | NBR | Exist | 1 |
| Comparative Example 8 | — | — | Titania | 100 | Nitric acid | NBR | Exist | 1 |
| Comparative Example 9 | — | — | Silica + Zirconia | 100 | Nitric acid | FKM | Exist | 1 |
| Comparative Example 10 | — | — | Silica + Zirconia | 100 | Nitric acid | NBR | Exist | 1 |

[1]FKM: Vinylidene fluoride-based Fluorocarbon Rubber composition, NBR: Nitrile rubber composition

INDUSTRIAL APPLICABILITY

According to the present invention, a material for gaskets wherein the liquid resistance adhesion to water and antifreeze is high, and rubber in a portion in contact with water or antifreeze hardly exfoliates in actual use environments of engines for cars or the like can be provided without performing chromate treatment.

The invention claimed is:

1. A material for gaskets, comprising at least a substrate formed of a metal plate, a metal surface coating layer formed on one side surface or both side surfaces of the substrate, a rubber layer formed via the metal surface coating layer on the substrate, and a primer layer formed between the metal surface coating layer and the rubber layer, wherein the primer layer comprises a cured product of a phenolic resin or a cured product of an epoxy resin, wherein the rubber layer is formed in a portion in contact with engine coolant, and wherein
the metal surface coating layer consists of (A) one or more carbonates selected from the group consisting of Mg carbonate, Co carbonate, Zr carbonate, Mn carbonate, Ni carbonate, and Cu carbonate and (B) one or more selected from the group consisting of silica, alumina, zirconia, and titania.

2. The material for gaskets according to claim 1, wherein the rubber forming the rubber layer is a nitrile rubber.

3. The material for gaskets according to claim 2, wherein the metal surface coating layer is a surface coating layer formed by applying a treatment liquid for forming the metal surface coating layer, the treatment liquid comprising (A) one or more carbonates selected from the group consisting of Mg carbonate, Co carbonate, Zr carbonate, Mn carbonate, Ni carbonate, and Cu carbonate and (B) one or more selected from the group consisting of silica, alumina, zirconia, and titania, to a surface of the substrate and then drying the treatment liquid.

4. The material for gaskets according to claim 1, wherein the rubber forming the rubber layer is a Fluorocarbon Rubber.

5. The material for gaskets according to claim 4, wherein the metal surface coating layer is a surface coating layer formed by applying a treatment liquid for forming the metal surface coating layer, the treatment liquid comprising (A) one or more carbonates selected from the group consisting of Mg carbonate, Co carbonate, Zr carbonate, Mn carbonate, Ni carbonate, and Cu carbonate and (B) one or more selected from the group consisting of silica, alumina, zirconia, and titania, to a surface of the substrate and then drying the treatment liquid.

6. The material for gaskets according to claim 1, wherein the metal surface coating layer is a surface coating layer formed by applying a treatment liquid for forming the metal surface coating layer, the treatment liquid comprising (A) one or more carbonates selected from the group consisting of Mg carbonate, Co carbonate, Zr carbonate, Mn carbonate, Ni carbonate, and Cu carbonate and (B) one or more selected from the group consisting of silica, alumina, zirconia, and titania, to a surface of the substrate and then drying the treatment liquid.

* * * * *